United States Patent [19]

Santo

[11] 4,181,739

[45] Jan. 1, 1980

[54] METHOD OF PROCESSING LOOSE HERRING ROE

[75] Inventor: Yoshiji Santo, Machida, Japan

[73] Assignee: Nippon Suisan Kabushiki Kaisha, Tokyo, Japan

[21] Appl. No.: 898,854

[22] Filed: Apr. 21, 1978

[30] Foreign Application Priority Data

Jan. 17, 1978 [JP] Japan ............................ 52-3525

[51] Int. Cl.² .......................................... A23C 19/00
[52] U.S. Cl. .................................. 426/272; 426/643
[58] Field of Search ............... 426/643, 455, 272, 645

[56] References Cited

U.S. PATENT DOCUMENTS 7,895   1/1951   Westacott ........................ 426/643

FOREIGN PATENT DOCUMENTS 46-42556 12/1971 Japan ............................................ 426/643
421159   8/1974 U.S.S.R. ....................................... 426/643

*Primary Examiner*—S. Leon Bashore
*Assistant Examiner*—Mike Goldman
*Attorney, Agent, or Firm*—Wenderoth, Lind & Ponack

[57] ABSTRACT

A method of processing the loose roe of Atlantic herring which comprises soaking the loose herring roe in three to five stages in salt solutions having different concentrations ranging from at least 2% in the initial stage to the saturation level in the final stage and forming by cohesion the loose roe into a product of a desired shape.

7 Claims, No Drawings

METHOD OF PROCESSING LOOSE HERRING ROE

BACKGROUND OF THE INVENTION

The present invention relates to a method of processing loose herring roe, particularly the loose roe of the Atlantic herring.

In general, herring live in the cold northern waters and are abundantly caught in those waters. Particularly along the coasts of the North American Continent, herring are abundantly caught in the North Pacific area, including the west coast of the United States and Canada, and in the North Atlantic area, including the New England coast of the United States and the coast of Newfoundland of eastern Canada. The ovary of herring taken in the Pacific area is eaten as cured herring roe and the body is utilized as dried herring, fish meal, fish oil, etc., while the herring caught in the Atlantic area are eaten mainly as smoked herring or pickled herring, and the ovary has mostly been wasted in the past.

The cured herring roe which are known in Japan as salted "kazunoko" is a food prepared by soaking the mature ovaries in a salt solution thereby to cure the eggs into a hardened aggregation. Kazunoko has been highly valued in Japan from ancient times. In Japan, kazunoko is ordinarily utilized as an expensive, high-grade food like "caviar", which is the egg of sturgeon, and is a very popular gourmet item particularly during the New Year holiday season.

The ovary of the herring caught in the Pacific area is different in nature from the ovary of the herring takein in the Atlantic area. The former is easy to process into cured herring roe suited for Japanese consumption, while the latter is almost wasted because there is presently no efficient process for processing it into kazunoko.

Accordingly, from the standpoint of efficient utilization of fishery resources, there is a need for a process by which the ovary of the herring caught in the Atlantic area can be processed into cured herring roe that could be sold at prices approaching that of kazunoko prepared from the ovary of the Pacific herring.

It is said that the Atlantic herring (*Clupea harengus*) lays eggs on offshore bottoms which consist mainly of mud, pebble and gravel. Therefore, the Atlantic herring exhibits a spawning behaviour essentially different from that of Pacific herring (*Clupea pallashii*), which has a habit of laying eggs on seaweeds. As a consequence, both the nature and membrane of the eggs differ greatly between the two types of eggs. The eggs of the Atlantic herring possess a low degree of cohesiveness. For this reason, the eggs of Atlantic herring cannot be formed into an adequately cohering mass when processed into salted kazunoko by the conventional method of soaking in salt solution. Moreover, the resultant product is softer than that prepared from the eggs of the Pacific herring and does not possess the desired crispness characteristic of kazunoko. As a consequence, the so-called "loose herring roe" in which the individual eggs are separated is used, not as kazunoko, but only by mixing with other foods such as kelp, sea urchin paste, etc., and in itself has very low commercial value.

In Japan, various attempts have been heretofore made to process loose roe, such as that of cod or capelin, into a product similar to a salted product of ovaries having a natural membrane. For example, Japanese Patent Laid Open Nos. 70551/75 and 61264/77 disclose a process which comprises adding egg white or a gelling agent, soy bean sauce, and sugar to individual eggs, encasing the mixture in an artificial casing or some other container, and sterilizing the mixture by heating the casing or container. In this process, however, the protein of the fish eggs is heat-coagulated whereby the eggs lose their raw quality. Also, according to the process disclosed in Japanese Patent Laid open No. 148061/76, minced fish meat and starch are added to the loose roe of capelin which is washed, and the mixture is stirred, after which it is filled in a natural casing, and the content is then sterilized by boiling. In this case, the content is also converted into a product that is far from being a fresh food, and the resulting product assumes an alien characteristic that comes from the presence of the filler and binder.

Under these circumstances, we have made various attempts to develop a process for producing a product made from loose roe which is free of the above described disadvantages, i.e., cured herring roe or salted kazunoko of the Atlantic herring that possesses a crispness which is almost the same as that of salted kazunoko obtained from the Pacific herring. As a result, I have found that the above described object can be achieved by subjecting the loose herring roe of the Atlantic herring to a series of soakings in salt solutions. This invention has been developed on the basis of this discovery.

SUMMARY OF THE INVENTION

The method of processing the loose roe of the Atlantic herring according to the present invention comprises soaking the loose herring roe in three to five stages in sodium chloride (NaCl) salt solutions having different NaCl concentrations ranging from at least 2% in the initial stage to the saturation level in the final stage and forming by cohesion the loose roe into a product of a desired shape.

Because additives and heat treatment are not used in the method of this invention, it makes possible the production from the Atlantic herring a cohesive product which is devoid of alien characteristics, retains the crispness of the raw roe, and has a texture and feeling similar to that of salted kazunoko.

In addition, the present invention makes possible the forming of the loose herring roe into a product having a desired shape merely by filling a container with the roe at the initial stage without using a casing.

DETAILED DESCRIPTION

The loose roe of the Atlantic herring which can be used in the present invention is obtained by slitting the bellies of the herring and collecting the ovaries therefrom or by collecting the mature or semi-mature broken ovaries obtained in the course of filleting the herring and disintegrating the ovaries into individual eggs by using a wire mesh, for example.

In the practice of the process of the present invention, the above described loose herring roe are completely deblooded by washing with water, after which they are placed in a container, such as a pan, having the desired shape.

Then, the container is soaked in salt solutions of varying concentrations in 3 to 5 stages, the concentration being at least 2%, preferably 2 to 5% in the initial stage, and progressively increasing to the saturation level at the final stage. In this case, at the second and subsequent stages, the roe removed from the container is subjected to soaking. By practicing this soaking operation, a product of loose herring roe which is cohesive and well formed into the desired shape is obtained. The differences in concentration between the adjacent salt solutions are suitably in the range of 5 to 10%. The soaking temperature is in the range of 3° to 8° C., preferably 4° to 6° C. A soaking time of 20 to 24 hours with respect to each soaking stage is sufficient. However, it is desirable that the last stage soaking in the saturated salt solution be carried out for a period of at least 3 days, ordinarily 3 to 7 days. The product thus obtained is kept soaked in a saturated solution of salt. In use, the product is desalted.

By soaking the loose herring roe in salt solutions of different concentrations in stages, the individual eggs are gradually dehydrated to the center by osmotic pressure and become hardened, whereby a product which is crispy like salted kazunoko made from the Pacific herring is obtained. The processed product is in a cured state that retains good cohesiveness even after it is desalted by immersing in water before use. The desalted product can be eaten as it is or by adding suitable seasonings or by slicing it into a suitable thickness, such as 2 mm, for use in preparing sushi (rice balls) or hors d'oeurves, for instance.

In order to indicate more fully the nature and utility of this invention, the following specific example of practice is set forth, it being understood that the example is presented as illustrative only and that it is not intended to limit the scope of the invention.

EXAMPLE

Herring (*Clupea harrengus*) of good freshness caught in the Bay of Fundy on the east coast of Canada were gutted to collect their ovaries. 2 Kg of the ovaries thus obtained was placed in a polyethylene container. After being left standing in cold water for 10 minutes, the container was emptied over a wire mesh of 5-mm mesh size. The ovaries were screened by rubbing them with the palm of the hand to remove their membranes. Further, these ovaries were screened over a wire mesh of 1.5-mm mesh size to separate them completely into individual eggs.

3 Kg of cold water was added to 1.4 Kg of the green eggs thus obtained and the mixture was stirred for one minute. After the mixture was left standing for five minutes, the water was removed therefrom. This operation was repeated three times, and yellow eggs were obtained.

These eggs were drained and then placed in a stainless pan measuring 10cm×20cm×2.5cm (height). Thereafter, these eggs were subjected to the following four stages of salt solution soaking at a temperature of 5° C.:

(1) The pan was soaked in a 5% salt solution for 24 hours;
(2) The mass of the eggs removed from the pan was soaked in a 10% salt solution for 24 hours;
(3) The mass was soaked in a 20% salt solution for 24 hours; and
(4) The mass was soaked in a 25% (saturated) salt solution for 3 days.

After the above described treatment steps, the product thus obtained was kept soaked in a saturated salt solution until the processed product thus obtained was soaked in cold water for 8 hours to desalt it.

The product of this invention was compared with salted kazunokos prepared from the ovaries of the Atlantic herring and the Pacific herring (caught off the west coast of Canada) prepared by using a conventional processing method. The results are shown below.

| | Color tone | Hardness (before desalting) | Feeling in mouth (after desalting) | Degree of cohesiveness of eggs (after desalting) |
|---|---|---|---|---|
| Product of this invention | good | moderate | good (crispy) | good |
| Control product Atlantic roe product | good | moderate | poor (scarcely crispy) | poor (become loose) |
| Pacific roe product | good | moderate | good (crispy) | good |

Further, the crispy quality of the respective products was evaluated by a skilled panel consisting of twenty persons. Eighteen persons preferred the product of this invention to the Atlantic kazunoko. This means that the product of this invention was significantly superior to the Atlantic kazunoko with a probability of 0.1%.

In comparison with the Pacific product, nine persons preferred the product of this invention, while eleven persons preferred the Pacific product. This means that the product of this invention was almost equal to the Pacific product.

I claim:

1. A method of processing the loose roe of the Atlantic herring which comprises placing the loose herring roe in a first container, soaking the roe in an initial sodium chloride salt solution, removing the mass of the roe from the first container, soaking the roe in two to four additional salt solutions and forming by cohesion the roe into a product of a shape corresponding to a container, said salt solutions having different concentrations of sodium chloride therein ranging from at least 2% in the initial solution to the saturation level in the final solution.

2. A method as claimed in claim 1 wherein, in the initial solution, the loose herring roe contained within said container is soaked in a salt solution of a concentration of 2 to 5% and, in the second solution and subsequent solutions, the roe, removed from the first container, is soaked in salt solutions with concentrations progressively increasing to the saturation level.

3. A method as claimed in claims 1 or 2 wherein the difference in concentration between adjacent salt solutions is in the range of 5 to 10%.

4. A method as claimed in claims 1 or 2 wherein the soaking temperature is in the range of 3° to 8° C.

5. A method as claimed in claims 1 or 2 wherein the soaking time in each of the salt solutions is in the range of 20 to 24 hours.

6. A method as claimed in claims or 2 wherein the soaking is carried out for at least 3 days, ordinarily 3 to 7 days, in the final saturated salt solution.

7. A method according to claim 1 wherein, in the initial solution, the loose herring roe contained within said first container is soaked in a salt solution of a concentration of 2 to 5% and, in the second solution and subsequent solutions, the roe is soaked in salt solutions with concentrations progressively increasing to the saturation level with the difference in concentration between adjacent salt solutions being in the range of 5 and 10%, the soaking time in each of the salt solutions being in the range of 20 to 24 hours, except for the final saturated salt solution wherein the soaking time is carried out for 3 to 7 days and whereby the soaking temperature in each solution is 3° to 8° C.

* * * * *